J. W. ACHARD.
MEANS FOR OPERATING END CELL SWITCHES.
APPLICATION FILED MAR. 21, 1905.
955,448.  Patented Apr. 19, 1910.
4 SHEETS—SHEET 1.
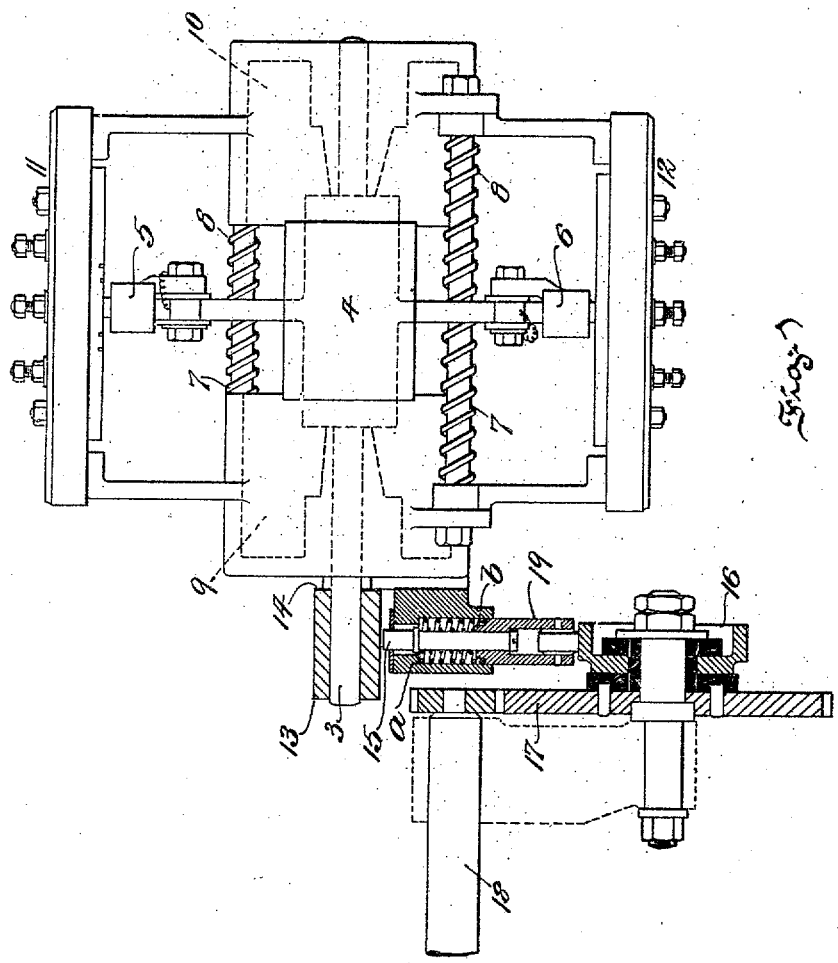

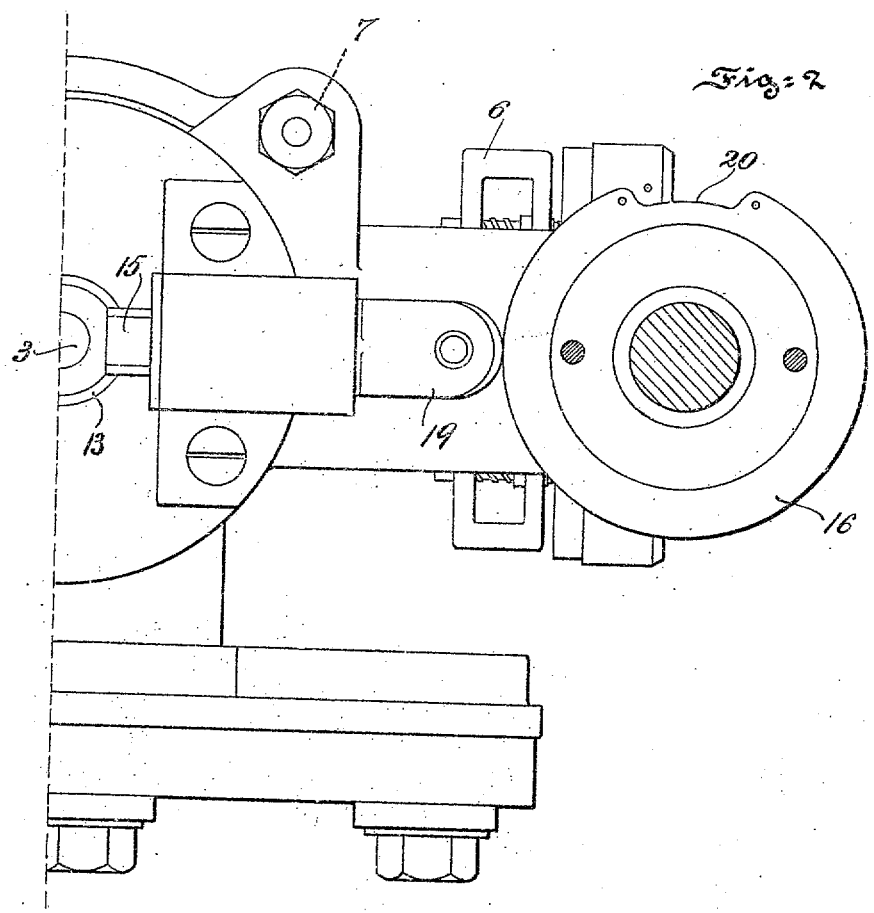

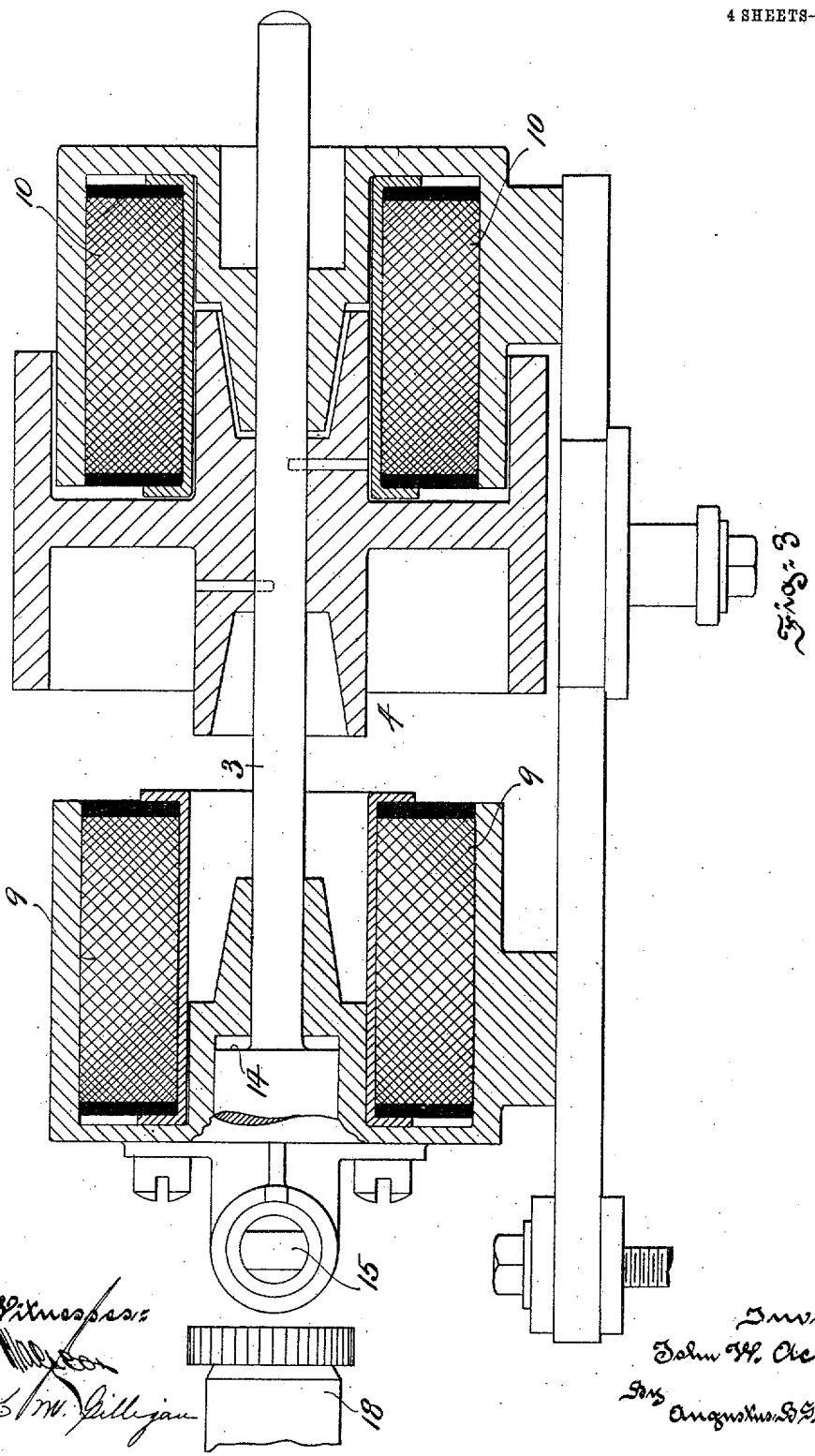

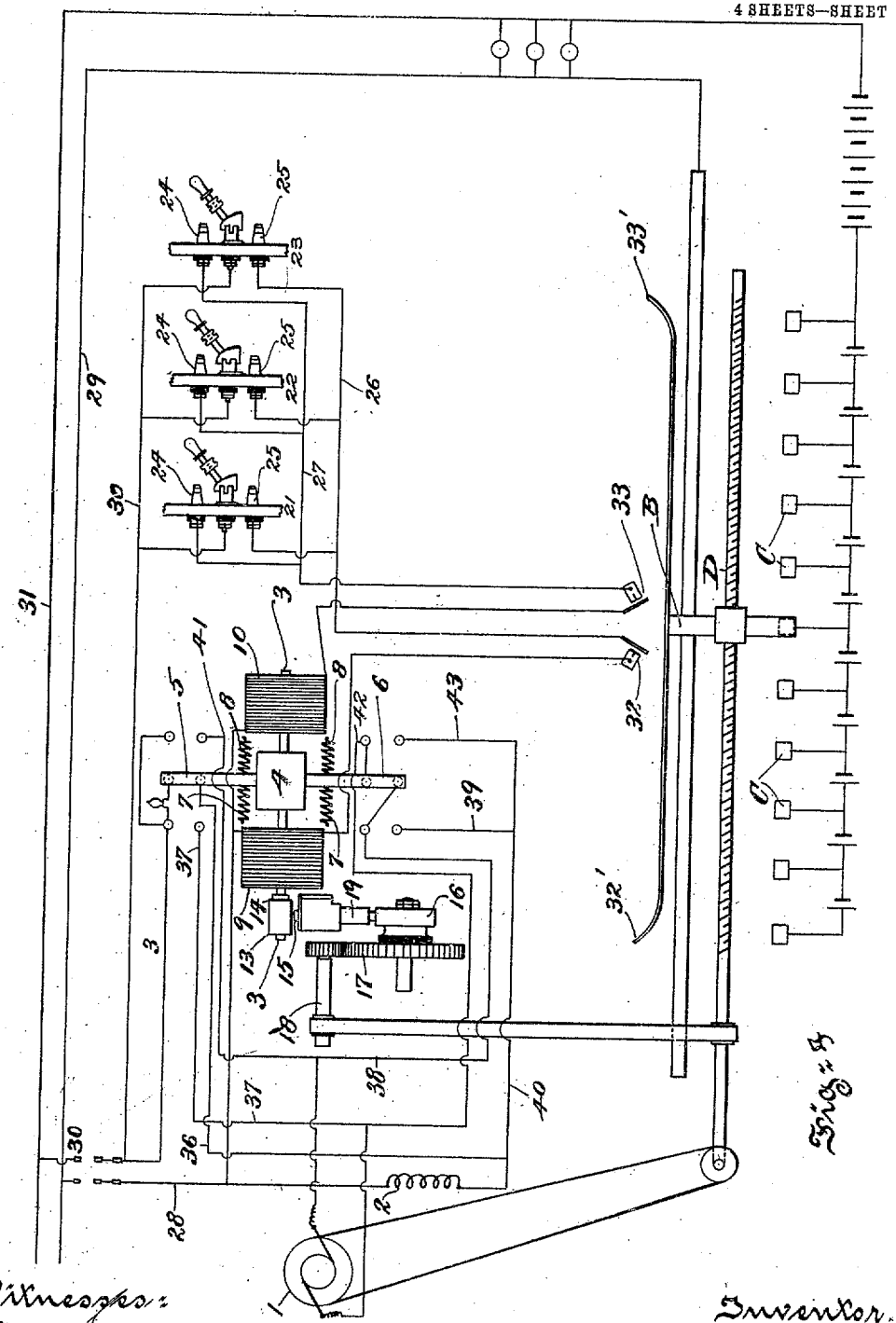

UNITED STATES PATENT OFFICE.

JOHN W. ACHARD, OF PHILADELPHIA, PENNSYLVANIA.

MEANS FOR OPERATING END-CELL SWITCHES.

955,448. Specification of Letters Patent. Patented Apr. 19, 1910.

Application filed March 21, 1905. Serial No. 251,224.

*To all whom it may concern:*

Be it known that I, JOHN W. ACHARD, a citizen of the United States, residing at the city of Philadelphia, in the county of Philadelphia and State of Pennsylvania, have invented certain new and useful Improvements in Means for Operating End-Cell Switches, of which the following is a specification.

Objects of the invention are to provide comparatively simple, reliable and efficient means for actuating an end cell switch, to enable the end cell switch to be operated from various parts of the plant, and to provide simple means whereby the motor of the switch can be manually started in either direction and will be automatically arrested when it is in proper position for bringing the brush of the switch to rest upon one of the contacts.

The invention comprises the improvements to be presently described and finally claimed.

The nature, characteristic features and scope of my invention will be more fully understood from the following description taken in connection with the accompanying drawings forming part hereof and in which—

Figure 1, is a plan view partly in section illustrating mechanism embodying features of the invention. Fig. 2, is an end view drawn to an enlarged scale and showing a half of the mechanism illustrated in Fig. 1. Fig. 3, is an elevational view partly in section, and Fig. 4, is a diagrammatic view.

In the drawings 1 and 2, are the armature and field of the motor which serves to drive the brush B of the end cell switch in one direction or the other along its contacts C usually through the intervention of a nut and screw gear D. These parts are well understood.

3, is a balanced electro-magnetic pole changer normally interrupting the motor circuit. It consists of an endwise movable rod 4, carrying brushes 5 and 6, and normally held in a certain position by means of balanced springs 7 and 8.

9 and 10, are electro-magnets which when energized serve to shift the rod 3, in one direction or the other according as one or the other of the electromagnets is energized, and when the rod 3, is thus shifted, its brushes 5 and 6, are moved in respect to the contacts 11 and 12, thus reversing the motor connections and causing the motor to run in one or the other direction. As soon as the electro-magnets 9 and 10 are de-magnetized, the springs 7 and 8 tend to balance each other and return the rod 3 to its initial position, in which the brushes 5 and 6, coöperating with their contacts, cut the motor entirely out of circuit. The rod 3, is, however, provided with shoulders or the like 13 and 14, which are engaged by a bolt 15, so that when the rod 3, is shifted it serves to start the motor in one direction or the other, and the bolt 15, by engaging the shoulders 13 or 14, holds the rod in such position even after the magnet which caused its initial motion has been deënergized. The purpose of this is to be sure that the travel of the motor shall be sufficient to insure its having positioned the brush $b$ of the switch properly upon a contact C. The bolt 15, is operated by a cam 16, driven by gearing 17, from a shaft as 18, which receives its motion from the motor or from some part driven by the motor Upon the starting of the motor, the shank 19, of the bolt 15, rides above the low part 20, of the cam, thus causing the spring $b$, to push the bolt 15, toward the shaft 3, and as soon as one of the shoulders 13 and 14, comes opposite the bolt, the latter is pushed forward so as to engage it, and the bolt remains in engagement with the shoulder until the cam 16, has made a complete revolution whereupon the bolt shank 19, under the influence of the spring $a$, returns to the low part of the cam and the rod 3, being thus released, is returned by the springs 7 and 8, to its balanced position unless the appropriate one of the magnets should remain energized in which case the cam would simply make another revolution.

To energize the magnets, use may be made of as many switches 21, 22 and 23 as may be required and these switches can be located at convenient points throughout the plant so that the attendant can effect necessary end cell switch regulation from different places, for example, from different floors.

These manual switches 21, 22 and 23, are alike and are so constructed that when released they do not make contact so as to carry current but they can be closed in respect to two contacts 24 and 25. The magnets 9 and 10, are connected in the branches 26 and 27, of a conductor 28, which leads to the line or bus bar 29. The contacts 24, of each of the manual switches are connected to the branch conductor 27, which includes the magnet 10, and the contacts 25, of each of the manual switches are connected to the branch 26, which includes the magnet 9. A conductor 30, leading from the bus bar or line 31, is connected with the handles of the various manual switches. If contact be made between the handle and the contact 24, the circuit will be by way of 30, 27, magnet coil 10, and conductor 28. If the handle be turned so as to contact with 25, the circuit will be as before to the handle but from it will be by way of 25, 26, and the magnet coil 9. 32 and 33, indicate the usual safety switches that are operated by a moving part $33^1$ and $32^1$ of the switch when its brush is at the end of its travel, so that when one or the other of them is held open by the moving part $33^1$ or $32^1$, it is impossible to energize the magnet which corresponds with further motion of the brush beyond the limit of its travel. When the rod 3, is in balanced position as shown in Fig. 4, current may pass from 35, to 36, through the field 2, and to 28, but the armature 1, is cut out of circuit and therefore the motor is at rest. When the rod 3, is shifted toward the left in Fig. 4, current may pass from 35 to 37, through the armature 1, to conductor 38, thence to conductor 39, and through conductor 40, and the field 2, thus the field and armature are in series and the motor will run in one direction. When the rod 3, is shifted toward the right in Fig. 4, current may pass from 35, to 41, thence through the motor and by conductor 42, to conductor 43, and thence through conductor 40, and the field 2. In consequence of this the motor will run in the opposite direction.

It will be obvious to those skilled in the art to which my invention appertains that modifications may be made in detail without departing from the spirit thereof, hence the invention is not limited further than the prior state of the art may require, but

Having thus described the nature and objects of my invention, what I claim as new and desire to secure by Letters Patent is:

1. Means for operating an end cell switch which comprise the combination of a driving motor, a motor controller normally causing the motor to remain at rest, means independent of the movement of the motor for shifting the controller to start the motor in the required direction, and means responding to movement of the motor and adapted to mechanically engage and lock the controller when shifted during a pre-determined travel of the motor and to then automatically release it, substantially as described.

2. Means for driving an end cell switch which comprise the combination of a motor, an electro-magnetic pole changer normally interrupting the motor circuit, circuit closers and their circuits for electro-magnetically shifting the pole changer to start the motor in the required direction, and mechanical means responding to the movement of the motor and adapted to mechanically engage the pole changer when shifted and to lock it during a pre-determined travel of the motor and to then automatically release it, substantially as described.

3. In an end cell switch driving mechanism the combination of a movable member provided with means constituting a motor starting and reversing controller, springs connected with said member, electro-magnets for shifting said member, means for energizing the magnets, and mechanical detent provisions for locking said member when shifted and for subsequently releasing it, substantially as described.

4. In an end cell switch driving mechanism the combination of a movable member constituting a motor starting and reversing controller and provided with high and low parts, a cam and its follower, and a spring bolt carried by the follower and adapted to coöperate with the high and low parts to lock the movable member in two positions, substantially as described.

5. The combination in an end cell switch operating mechanism of a motor having a normally open reversing switch, electro-magnets for closing said switch to run the motor in one direction or the other, a mechanical device for mechanically locking said reversing switch during a pre-determined travel of the motor and then automatically releasing it, circuits for the electro-magnets, and manual switches for energizing one or the other of the magnets, substantially as described.

6. The combination in end cell switch operating mechanism of a driving motor, a controller for starting the motor in either direction, a plurality of switches and their circuit connections to the controller, and devices for automatically locking and releasing the controller after a predetermined travel of the motor, substantially as described.

7. Means for operating an end cell switch which comprise the combination of a driving motor, a controller for starting the motor in either direction and which is normally positioned to cause the motor to remain at rest, devices independent of the motion of the motor for shifting the controller thereby starting the motor in the required direction, and means responding to movement of the motor and adapted to operate upon the controller and hold it when shifted during a pre-determined travel of the motor and to then automatically release it, substantially as described.

In testimony whereof I have hereunto signed my name.

JOHN W. ACHARD.

Witnesses:
K. M. GILLIGAN,
F. E. FRENCH.